United States Patent
Loring et al.

(10) Patent No.: US 6,195,641 B1
(45) Date of Patent: Feb. 27, 2001

(54) NETWORK UNIVERSAL SPOKEN LANGUAGE VOCABULARY

(75) Inventors: Keith Loring, Coral Springs; Paratosh Patel, Deerfield Beach, both of FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/049,736

(22) Filed: Mar. 27, 1998

(51) Int. Cl.[7] .................................................. G10L 15/00
(52) U.S. Cl. ........................................ 704/275; 704/270
(58) Field of Search .................................. 704/270, 275, 704/243, 244, 255; 707/200, 104; 395/200.3

(56) References Cited

U.S. PATENT DOCUMENTS

| | | | |
|---|---|---|---|
| 4,922,538 | * 5/1990 | Tchorzewski | 704/247 |
| 5,355,433 | * 10/1994 | Yasuda | 704/243 |
| 5,425,128 | * 6/1995 | Morrison | 704/243 |
| 5,613,036 | * 3/1997 | Strong | 704/243 |
| 5,765,132 | * 6/1998 | Roberts | 704/254 |
| 5,774,628 | * 6/1998 | Hemphill | 704/255 |
| 5,819,220 | * 10/1998 | Sarukkai et al. | 704/243 |
| 5,905,773 | * 5/1999 | Wong | 704/275 |

OTHER PUBLICATIONS

Hataoka, N. et al., Speech Recognition for Automatic Telephone Operator based on CSS Architecture, 2nd IEEE Workshop on Interactive Voice Technology for Telecommunications Applications, pp. 77–80, 1994.*

"Specialized Language Models for Speech Recognition", IBM Technical Disclosure Bulletin, US, IBM Corp. New York, vol. 38, No. 2, p. 155–157 XP000502428 ISSN: 0018–8689.

"Client–Server Model for Speech Recognition", IBM Technical Disclosure, US, IBM Corp. New York, vol. 36, No. 3, p. 25–26 XP000354688, ISSN: 0018–8689.

* cited by examiner

*Primary Examiner*—Richemond Dorvil
*Assistant Examiner*—Angela A. Armstrong
(74) *Attorney, Agent, or Firm*—Akerman Senterfitt

(57) ABSTRACT

A network spoken language vocabulary system for a speech application comprises: a network server and a plurality of network clients communicating with one another over a network; a central vocabulary list in the server for recognizable words; a speech recognition engine and a local vocabulary list cache in each of the clients. The cache can have therein previously recognized words communicated from the central vocabulary list in the server and new words recognized by the speech application. Each of the new words can be communicated to the server and added to the central vocabulary list and each of the new words added to the central vocabulary list can be communicated to at least one other of the clients for addition to the cache. The new words can be automatically communicated to and from the server.

19 Claims, 1 Drawing Sheet

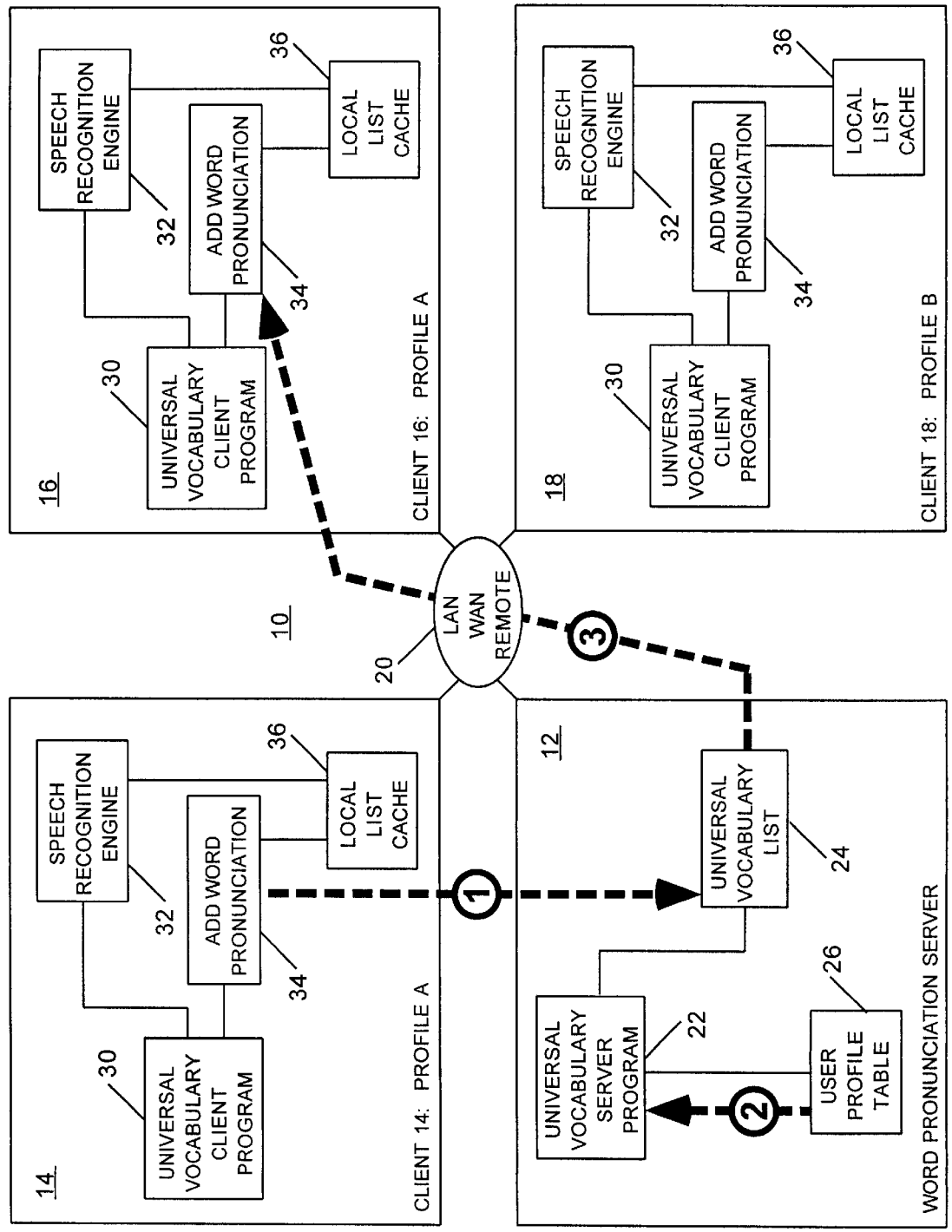

NETWORK UNIVERSAL SPOKEN LANGUAGE VOCABULARY

BACKGROUND OF THE INVENTION

1. Field of the Invention

This invention relates generally to the field of speech applications, and in particular, to a method and apparatus for automatically storing, tracking and distributing new word pronunciations to speech application clients on a network.

2. Description of Related Art

Use of spoken language with computers, typically associated with speech recognition and speech synthesis, involves storing and retrieving not only word spellings but other data associated with words, for example phonemes, alternate pronunciations, associations with other words and parts of speech, such as noun, verb, adjective and the like.

Computer systems at first were developed to deal exclusively with written language. Written language is useful for many things, and is much simpler to interpret, represent within, and reproduce from a computer system than is spoken language. Today, computer systems are taking on spoken language in the form of two technologies, namely, speech recognition and speech synthesis. Speech synthesis is also referred to as text-to-speech (TTS).

Defining the work to be done by computers to support spoken language is aided by comparing spoken language to written language. In the intersection of these two forms of communication there are words. Outside of the intersection words are represented differently, as spoken sounds or written letters. Written language is also augmented outside of the intersection by punctuation, or even font variations such as bold for emphasis. Spoken language is augmented differently outside of the intersection, for example by volume, pitch, prosody (speed), and inflection.

As computers tackle support for spoken language, spoken language as typically spoken is converted to text form by way of speech recognition and converted back to spoken form by way of speech synthesis. This takes advantage of the significantly reduced requirements on system resources to store or transmit a written representation as compared to an audible representation. The differences between written and spoken words outside of the intersection create a number of problems for speech applications.

End-users are greatly inconvenienced by the need to add word pronunciations which are not included in the starter set of vocabulary words which can be recognized. By design, the user encounters this problem as a special case of a word which was recognized incorrectly. Recognition can be viewed as a best-guess by the recognition engine as to which word was spoken by the user. When the user speaks a word which is not known to the recognition engine, the engine simply guesses wrong. The user must then initiate correction of the word and choose a new word from a short list of appropriate alternatives. If the spoken word is not listed as an alternate choice, the user typically is required to type the word and perhaps pronounce it again. This inconvenience can encourage users to bypass the proper correction procedures and simply type in the corrected text. Unfortunately, although this procedure is quicker in the short run, it is important that the speech recognition system learn about the correction with the proper procedures because this information is the only way to add and correct words, thereby improving future recognition performance.

Speech recognition engines as supplied in speech applications just aren't accurate enough and are sometimes slow in throughput due to misrecognitions and the time needed to correct misrecognitions.

Correcting misrecognized words is a major factor in measures of speech recognition effectiveness including words-per-minute and usability. Large vocabularies are provided to limit the number of corrections resulting from out-of-vocabulary words.

In a stand alone system, user added words need to be backed up and migrated from system to system as a user moves around or switches between systems (for example, between home and office computers and between portable and desktop computers) or upgrades a computer or a speech recognition application, or both. This task is time consuming, tedious, unobvious, and subsequently, not generally done.

Typically, along with speech recognition or synthesis software, a starter set of words, including pronunciations, is installed on a computer. Pronunciations are stored as base forms, which represent instructions as to the way words are pronounced, or sound. Many factors must be considered in order to produce an ideal starter set for a given application. The number of words in a starter set is usually determined by balancing considerations such as amount of storage space required, frequency of word use, degree of common use, and recognition accuracy against all other words in the starter set. Developers of speech recognition systems typically install a large vocabulary of word-pronunciation data as required for recognition. It is a rather tedious and time consuming task to produce such a vocabulary.

SUMMARY OF THE INVENTION

A network universal spoken language vocabulary developed and managed in accordance with the inventive arrangements overcomes all of the problems noted in the prior art. The inventive arrangements automate and optimize storage, tracking, sharing, and delivery of spoken language vocabulary data. Word information regarding all known words can be distributed from a network connected server. New words added by any client user are made available to all users, eliminating the need for subsequent users to each provide data regarding that same new word.

Fewer manual additions of pronunciations are required from each user, so that the users are more likely to follow those procedures for correcting misrecognitions in a manner which teaches the speech application new words, thus improving future recognition performance for all users.

A speech recognition and/or speech synthesis system or application according to the inventive arrangements eliminates the need for more than one user to add a new word. Only the very first user of a new word needs to add that new word. The system can, while recognizing or determining alternatives, query a universal vocabulary server for a new word and will not bother the user to provide the data.

Increased accuracy and throughput of speech recognition are among the advantages of a highly optimized, cached universal vocabulary simply by virtue of a higher hit-rate between words spoken and words known and accurately recognized.

The requirements for installing and maintaining a large vocabulary on each system is advantageously reduced. It is transparent to the user that some words are stored on a server, and as the system gets used, caching will increase the hit-rate, reducing the number of words stored on a client as well as generally speeding things up.

The need to maintain a users added words, and the need to individual back up and migrate updated vocabulary lists is advantageously eliminated by centralized data backup.

The burden of carefully selecting the most appropriate starter set in advance is advantageously eliminated because specialized words will be added efficiently and in a shared-burden manner by the network of users. On the contrary, the vocabulary for all users is automatically updated as needed, without requiring user interaction.

A network spoken language vocabulary system for a speech application, in accordance with an inventive arrangement, can include a network server and a plurality of network clients communicating with one another over a network; a central vocabulary list in the server for recognizable words; a speech recognition engine and a local vocabulary list cache in each of the clients. The cache can have therein previously recognized words communicated from the central vocabulary list in the server and new words recognized by the speech application. Each, each of the new words can be communicated to the server and added to the central vocabulary list. Each of the new words added to the central vocabulary list can be communicated to at least one other of the clients for addition to the cache.

The new words can be automatically communicated from the clients to the server and can also be automatically communicated from the server to one or more clients.

The server can further comprise a user profile table having data therein for each of the users indicative of a respective subset of the central vocabulary list for use in speech recognition data and/or indicative of membership in a work group. When this data is available, each new word communicated to the server from any user in one of the workgroups can be automatically communicated back to all other users in the work group. Moreover, each user in the work group can receive the same subset of the central vocabulary list for use in speech recognition.

Each of the clients can further comprise an add word pronunciation tool for identifying the new words to be communicated to the server, and for adding the new words to the cache. The add word pronunciation tool can add the new words as recognized by the speech recognition engine in the client and as communicated from the server.

The central vocabulary list can comprise a plurality of data records for each word, the data records including: spelling; phonemes; usage domains; client of origin; and, workgroups requiring the word.

A network spoken language vocabulary system for a speech application, in accordance with another inventive arrangement, can comprise a network server having a permanent central vocabulary list for recognizable words and a user profile data base; a plurality of network clients, and a network over which the server and the clients can communicate. The cache has stored therein a subset of previously recognized words communicated from the central vocabulary list in the server and new words as recognized by the speech application during the session. Each of the new words can be communicated to the server and added to the central vocabulary list. Each of the new words added to the central vocabulary list can be communicated to other ones of the clients in accordance with data in the user profile data base.

The new words can be automatically communicated to and from the server.

The user profile data base has data therein for each of the users indicative of a respective subset of the central vocabulary list for use in speech recognition and/or indicative of membership in a work group. When this information is available, each new word communicated to the server from any user in one of the workgroups can be automatically communicated back to all other users in the work group. Moreover, each user in the work group can receive the same subset of the central vocabulary list for use in speech recognition.

Each of the clients can further comprise an add word pronunciation tool for identifying the new words to be communicated to the server, and for adding the new words to the cache. The add word pronunciation tool can add the new words as recognized by the speech recognition engine in the client and as communicated from the server.

The central vocabulary list can comprise a plurality of data records for each word, the data records including: spelling; phonemes; usage domains; client of origin; and, workgroups requiring the word.

BRIEF DESCRIPTION OF THE DRAWINGS

The sole FIGURE is a block diagram of a network universal spoken language vocabulary system in accordance with the inventive arrangements.

DETAILED DESCRIPTION OF THE PREFERRED EMBODIMENTS

A comprehensive system 10 which covers all facets of vocabulary support for spoken language technologies such as speech recognition and speech synthesis is shown in the sole Figure. The system comprises a word pronunciation or vocabulary server 12 connected to a plurality of vocabulary clients 14, 16 and 18 over a network 20. The network 20 can be a local area network (LAN) or a wide area network (WAN). In accordance with the inventive arrangements, the word pronunciation or vocabulary server 12 is a universal repository for all known words and associated spoken language attributes. New words are acquired from and distributed to network clients as needed.

The word pronunciation server 12 comprises a universal vocabulary server program 22, a universal vocabulary list, or data base 24 and a user profile table 26. The word pronunciation server 12 is a network connected computer system which hosts the universal vocabulary database and the universal vocabulary server software program 22 which responds to requests by client computer systems which are running speech recognition or speech synthesis programs.

The universal vocabulary list 24 includes all words known to the system including the spelling and data indicating how the word is pronounced. The term universal denotes throughout the network. In this sense, the universal vocabulary list can also be thought of as a central or master vocabulary list. Data records for each word entry include the following information: spelling; phonemes, that is, pronunciation data; list of usage domains; origin, that is, who added the word; and, workgroup, that is, which users are likely to use the word.

The user vocabulary profile 26 is a database which contains information required to support the universal vocabulary client program. Data regarding which word groups a particular user uses, and the user groups which the user belongs to is maintained on the server and transmitted to each client when they begin a session with speech recognition or TTS software.

The term client is used in the sense of a work station served by the word pronunciation server. Users are persons working at the clients. The user profile table or data base 26 can be keyed to users, who can be identified for example by name or by log in identification, so that any user can be provided with the appropriate subset of vocabulary words irrespective of the particular work station or client being utilized. If the user of a particular client or work station is not in the user profile table, the user profile table can also be keyed on the client or word station identification. Alternatively, a default subset for unidentified users can also be defined. As a further and presently preferred alternative, an unidentified user can be prompted to supply sufficient information to be identified in the user profile table, and thereafter, be supplied with an appropriate subset vocabulary list and appropriate new words.

The proper vocabulary list can even be transferred to a remote work station by modem, satellite transmission, or the Internet, although immediate and automatic updates would be available only for so long as the remote link was maintained. In this respect, the network 20 also represents remote links.

Each of the clients 14, 16 and 18 comprises a universal vocabulary client 30, a speech recognition engine 32, an add word pronunciation tool 34 and a local vocabulary list cache 36, for storing a personalized subset of the universal vocabulary list 24. For purposes of illustration, clients 14 and 16 are members of a work group associated with a user profile designated A. Client 18 is a member of a work group associated with a user profile designated B.

The add word pronunciation tool 34 transmits word newly added to each client over the network 20 to the word pronunciation server 12, where the new words are added to the universal vocabulary list 24. The add word pronunciation tool 34 also receives new words from the word pronunciation server 12 over the network 20, and routes the new words to the local list cache 36.

The universal vocabulary client program 30 is an application which runs on a client system maintaining the local cached subset 36 of the universal vocabulary list 24. Words are added to the cache from the user and from the universal vocabulary list, while words which have expired in terms of cache-worthiness are deleted. The cache 36 is a dynamically optimized replacement for the traditional stand-alone starter-set vocabulary.

The programs which maintain the cache 36 employ algorithms which can consider network traffic, available local storage, frequency of use, system processor speed, current end-user task, and end-user settings to determine the parameters for the cache. The cache can be thought of as an optimal local vocabulary. The cache is optimal because specialized words known to be spoken by the user will be included, enhancing recognition, and at the same time, words known not to be spoken by the user will not be included, reducing processing time needed to search the cache for matches.

The client application sends data regarding newly added words to the universal vocabulary server program. By default, all words can be added as public, that is to be shared, but a user can choose to have added words held as private, if desired for any reason.

A simple example has been charted in the FIG. Client 14 has added a new word. The new word is transmitted over the network 20 from the add word pronunciation tool 34 to the word pronunciation server 12, where the new word is added to the universal vocabulary list 24, as indicated by dashed line arrow 1. If client 16 is dictating, or sometime thereafter begins dictating, the universal vocabulary server program 22 recalls the user profile for client 16 from the user profile table 26, as indicated by dashed line arrow 2. The profile reveals that client 16 belongs to the same workgroup as client 14, represented by the use of the same profile A. If client 16 is already dictating, the new word is delivered to client 16 and added to the local cache 36. If client 16 begins dictating, a personalized vocabulary list is delivered to client 16 and stored in the local cache 36. The new word added earlier by client 14 is included, because both user 14 and user 16 use profile A. Both instances are indicated by dashed line arrow 3.

In accordance with the inventive arrangements, a comprehensive database is dynamically and incrementally enhanced by users and automatically optimized over time to increase overall system performance and to balance computer system resources, such as network bandwidth and file and data storage, using caching techniques.

What is claimed is:

1. A network spoken language vocabulary system for a speech application comprising:
   a network server and a plurality of network clients communicating with one another over a network;
   a central vocabulary list in said server for recognizable words:
      a speech recognition engine and a dynamically updateable local vocabulary list cache in each of said clients, said cache storing a personalized subset of said central vocabulary list, said subset comprising previously recognized words communicated from said central vocabulary list in said server and new words recognized by said speech application; and,
      each of said new words being communicated to said server by said clients and added to said central vocabulary list and each of said new words added to said central vocabulary list being dynamically communicated by said server to at least one other of said clients for addition of said cache.

2. The system of claim 1, wherein said new words are automatically communicated back to said server.

3. The system of claim 1, wherein said new words are automatically communicated to and from said server.

4. The system of claim 1, wherein said server further comprises a user profile table having data therein for each of said users indicative of a respective subset of said central vocabulary list for use in speech recognition.

5. The system of claim 4, wherein said user profile table also has data therein for each of said users indicative of membership in a work group, each user in said work group receiving the same subset of said central vocabulary list for use in speech recognition.

6. The system of claim 1, wherein said server further comprises a user profile table having data therein for each of said users indicative of membership in a work group.

7. The system of claim 6, wherein each new word communicated to said server from any user in one of said workgroups is automatically communicated back to all other users in said work group.

8. The system of claim 1, wherein each of said clients further comprises an add word pronunciation tool for identifying said new words to be communicated to said server, and for adding said new words to said cache.

9. The system of claim 8, wherein said add word pronunciation tool adds said new words as recognized by said speech recognition engine in said client and as communicated from said server.

10. The system of claim 1, wherein said central vocabulary list comprises a plurality of data records for each word, said data records including: spelling; phonemes; usage domains; client of origin; and, workgroups requiring said word.

11. A network spoken language vocabulary system for a speech application comprising, comprising:

a network server having a permanent central vocabulary list for recognizable words and a user profile database;

a plurality of network clients, each having a speech recognition engine and a dynamically updateable local vocabulary list cache, said cache storing a personalized subset of said central vocabulary list;

a network over which said server and said clients can communicate;

said subset comprising previously recognizable words dynamically communicated from said central vocabulary list in said server and new words as recognized by said speech application during said session;

each of said new words being communicated to said server by a client and added to said central vocabulary list; and, each of said new words added to said central vocabulary list dynamically being communicated by said server to other said clients in accordance with data in said user profile database.

12. The system of claim 11, wherein said new words are automatically communicated to and from said server.

13. The system of claim 11, wherein said user profile database has data therein for each of said users indicative of a respective subset of said central vocabulary list for use in speech recognition.

14. The system of claim 11, wherein said user profile database has data therein for each of said users indicative of membership in a work group.

15. The system of claim 14, wherein each new word communicated to said server from any user in one of said workgroups is automatically communicated back to all other users in said work group.

16. The system of claim 11, wherein said user profile database has data therein for each of said users indicative of membership in a work group, each user in said work group receiving the same subset of said central vocabulary list for use in speech recognition.

17. The system of claim 11, wherein each of said clients further comprises an add word pronunciation tool for identifying said new words to be communicated to said server, and for adding said new words to said cache.

18. The system of claim 17, wherein said add word pronunciation tool adds said new words as recognized by said speech recognition engine in said client and as communicated from said server.

19. The system of claim 11, wherein said central vocabulary list comprises a plurality of data records for each word, said data records including: spelling; phonemes; usage domains; client of origin; and, workgroups requiring said word.

* * * * *